(12) United States Patent
Park

(10) Patent No.: US 10,006,412 B2
(45) Date of Patent: Jun. 26, 2018

(54) CANISTER CLOSED VALVE FOR AUTOMOTIVE FUEL SYSTEM

(71) Applicant: Hyundai Motor Company, Seoul (KR)

(72) Inventor: Jung Su Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days. days.

(21) Appl. No.: 15/202,992

(22) Filed: Jul. 6, 2016

(65) Prior Publication Data

US 2017/0122266 A1    May 4, 2017

(30) Foreign Application Priority Data

Oct. 30, 2015  (KR) .................. 10-2015-0151730

(51) Int. Cl.
| | |
|---|---|
| *F02M 25/08* | (2006.01) |
| *F16K 1/36* | (2006.01) |
| *F16K 27/02* | (2006.01) |
| *F16K 31/06* | (2006.01) |

(52) U.S. Cl.
CPC .... *F02M 25/0836* (2013.01); *F02M 25/0854* (2013.01); *F02M 25/0872* (2013.01); *F16K 1/36* (2013.01); *F16K 27/029* (2013.01); *F16K 31/0655* (2013.01); *F02M 2025/0845* (2013.01)

(58) Field of Classification Search
CPC .......... F02M 25/0836; F02M 25/0854; F02M 25/0872; F02M 2025/0845; Y10T 137/6184; Y10T 137/6188; Y10T 137/6191; Y10T 137/6195; F16K 31/0655; F16K 27/029; F16K 1/36

USPC .......... 251/129.02, 330; 137/329.01–329.04
See application file for complete search history.

(56) References Cited

U.S. PATENT DOCUMENTS

| | | | | |
|---|---|---|---|---|
| 2,682,386 | A | * | 6/1954 | Lindsay ................. F16K 39/02 137/625.27 |
| 2,924,233 | A | * | 2/1960 | Michaels ............... F16K 41/12 251/330 |
| 4,251,052 | A | * | 2/1981 | Hertfelder ............ H01F 7/1607 251/129.02 |

(Continued)

FOREIGN PATENT DOCUMENTS

| | | |
|---|---|---|
| JP | 2003-532853 A | 11/2003 |
| JP | 2010-025135 A | 2/2010 |

(Continued)

*Primary Examiner* — Eric Keasel
(74) *Attorney, Agent, or Firm* — Mintz Levin Cohn Ferris Glovsky and Popeo, P.C.; Peter F. Corless

(57) ABSTRACT

A canister closed valve for an automotive fuel system is positioned at a vent line of a canister, which is exposed to atmospheric air, so as to perform a sealing function for the fuel system. The canister closed valve includes a valve body for protecting a coil assembly and internal components, the coil assembly for converting electric energy into magnetic energy; a plunger and rod assembly, which is magnetized and is moved up and down so as to block a pipe channel when power is applied; a spring for restoring the plunger and rod assembly so as to open the pipe channel when the application of the power is shut off; and an inner housing, which is disposed in the valve body, accommodates the core and the plunger and rod assembly, and includes an internal space isolated from atmospheric air when the plunger and rod assembly is raised.

11 Claims, 3 Drawing Sheets

(56) References Cited

U.S. PATENT DOCUMENTS

| | | | | |
|---|---|---|---|---|
| 4,776,365 A | * | 10/1988 | Bathrick | F16K 1/02 |
| | | | | 137/329.02 |
| 5,358,005 A | * | 10/1994 | van Prooijen | F16K 31/0655 |
| | | | | 251/129.02 |
| 5,915,669 A | * | 6/1999 | Zabeck | F02M 25/0836 |
| | | | | 251/129.02 |
| 5,944,053 A | * | 8/1999 | Kabierschke | B60H 1/00485 |
| | | | | 137/625.29 |
| 6,499,472 B2 | * | 12/2002 | Weldon | F16K 31/0655 |
| | | | | 123/516 |

FOREIGN PATENT DOCUMENTS

| KR | 2002-0053133 A | 7/2002 |
|---|---|---|
| KR | 10-0412550 B1 | 12/2003 |
| KR | 2005-0093416 A | 9/2005 |
| KR | 10-0627230 B1 | 9/2006 |
| KR | 2007-0108656 A | 11/2007 |
| KR | 10-2012-0052113 A | 5/2012 |

* cited by examiner

CANISTER CLOSED VALVE FOR AUTOMOTIVE FUEL SYSTEM

CROSS-REFERENCE TO RELATED APPLICATION

This application claims under 35 U.S.C. § 119(a) the benefit of Korean Patent Application No. 10-2015-0151730 filed on Oct. 30, 2015, the entire contents of which are incorporated herein by reference.

BACKGROUND (a) Technical Field

The present invention relates to a canister closed valve for an automotive fuel system, more particularly, to a canister closed valve that is positioned at a vent line of a canister, which is exposed to atmospheric air, so as to perform a function of sealing the fuel system.

(b) Description of the Related Art

Generally, in order to comply with fuel system leakage monitoring regulations, in conjunction with On-Board Diagnostics (OBD), a filter tank pressure sensor (FTPS) and a canister closed valve (CCV) are applied to a fuel system.

In particular, in order to perform a function of sealing a fuel system, a canister closed valve (CCV) should be positioned at a pipe channel of a vent line, which is exposed to the atmosphere, and should be mounted behind the vent line and an air filter. Accordingly, the canister closed valve is not directly exposed to the external environment, but communicates with atmospheric air.

A canister closed valve, which is currently applied to vehicles, is a typical solenoid valve, which may include a solenoid (magnetic circuit component) for converting electric energy into magnetic energy and a valve actuating part for converting magnetic energy into kinetic energy so as to open or close a pipe channel.

In such a canister closed valve, when the power is applied to a coil, a core and a plunger are magnetized by a magnetic field, thereby causing a plunger to move up and down. At this point, since the core and the plunger must have sufficient magnetic performance, suitable materials are limited.

FIG. 3 (RELATED ART) is a cross-sectional view showing a conventional canister closed valve for an automotive fuel system.

The canister closed valve includes an upper body 100 for holding a coil assembly and for protecting internal components; a lower body 110 serving as a fluid flow channel; a plunger 120, which is magnetized and moved up and down upon the application of power; a coil assembly for converting electric energy into magnetic energy; a core 140 as a magnetic circuit component, which guides the upward and downward movement of a rod; a rod assembly 150, which is composed of the rod 150a and a seal 150b so as to block the pipe channel by the upward and downward movement of the plunger 120; and a spring 160 for pushing the rod assembly 150 and the plunger 120 so as to open the pipe channel.

Accordingly, during self-diagnosis, power is applied to the coil assembly 130, and the plunger 120 and the rod assembly 150 are lowered, thereby blocking the pipe channel of the lower body 110. Normally, the application of power is shut off, and the rod assembly 150 and the plunger 120 are raised by the restoring force of the spring 160, thereby opening the pipe channel of the lower body 110.

Recently, problems such as frequent lighting of an OBD warning lamp have occurred in certain extremely cold regions. As a result of various investigations, it was determined that malfunctions of the OBD warning lamp were caused by corrosion of the internal components of a canister closed valve, that is, a de-icing agent, which may be excessively dispersed on a road and splashed due to the travel of vehicles, and air containing calcium chloride power that is introduced into the inside of the canister closed valve through a vent line, which is exposed to the atmosphere, in the direction of the arrows in FIG. 3, thereby causing the internal components of the canister closed valve to be corroded.

Although the canister closed valve is not a component that is exposed to the external environment, it includes components that malfunction due to corrosion. Accordingly, for the purposes of reducing costs incurred by addressing claims and mitigating customer dissatisfaction, it is required to assure corrosion resistance of the associated components such that they are capable of a service life of 15 years or 150,000 miles.

The above information disclosed in this Background section is only for enhancement of understanding of the background of the invention and therefore it may contain information that does not form the prior art that is already known in this country to a person of ordinary skill in the art.

SUMMARY

An object of the present invention is to provide a canister closed valve for an automotive fuel system, which is able to prevent internal magnetic circuit components such as a plunger, a core and the like from being exposed to a corrosive environment, and thus to protect the components, by implementing a hermetical canister closed valve in which the shapes and arrangement of the plunger, the rod assembly, the core and the like among the components of the canister closed valve are changed, and a seal, which is symmetrical with respect to a horizontal line and is capable of functioning to block a pipe channel as well as to prevent the magnetic circuit components from being corroded.

In order to achieve the above object, the canister closed valve for an automotive fuel system according to the present invention has the following characteristics.

In one aspect, the present invention provides a canister closed valve for an automotive fuel system, including a valve body for protecting a coil assembly and internal components, the coil assembly for converting electric energy into magnetic energy, a plunger and rod assembly, which includes a core magnetized when power is applied thereto, a plunger portion, a rod portion and a sealing portion, and which is magnetized and is moved up and down so as to block a pipe channel when power is applied thereto, a spring for restoring the plunger and rod assembly so as to open the pipe channel when the application of power is shut off, and an inner housing, which is disposed in the valve body, accommodates the core and the plunger and rod assembly and includes an internal space isolated from atmospheric air by the sealing portion when the plunger and rod assembly is raised.

In a preferred embodiment, the sealing portion of the plunger and rod assembly may be symmetrical with respect to a horizontal line so as to perform a function of blocking the pipe channel and a function of blocking the internal space of the inner housing.

In another preferred embodiment, the inner housing may be configured to have a cylindrical shape having an open lower end, and may be vertically disposed in an upper body of the valve body in the axial direction.

In still another preferred embodiment, the inner housing may include a flange formed at a lower end thereof, and the flange may be interposed between upper body and lower body of the valve body so as to couple the inner housing to the valve body.

In yet another preferred embodiment, the coil assembly may be fitted in a closed space defined between an inner surface of an upper body of the valve body and an outer surface of the inner housing.

In still yet another preferred embodiment, the core may include a guide, which is fitted into a hole in the core, through which the rod portion extends, so as to guide upward and downward movement of the rod portion.

In a further preferred embodiment, the core is disposed in the inner housing and is magnetized when power is applied.

In another further preferred embodiment, when power is applied to the coil assembly, the core and the plunger portion may be concurrently magnetized so as to apply an attractive force therebetween, thereby lowering the entire plunger and rod assembly.

The canister closed valve for an automotive fuel system according to the present invention is constructed such that the internal space of a magnetic circuit accommodating a core, a plunger and the like is isolated from atmospheric air by the hermetical sealing function of a seal during non-actuation of the valve (i.e. the opened state of a pipe channel), such that the internal components of the magnetic circuit are prevented from being exposed to a corrosive environment, and it is possible to reduce malfunctions owing to strengthened OBD components, which can result in fewer claims and increased customer satisfaction.

Other aspects and preferred embodiments of the invention are discussed infra.

BRIEF DESCRIPTION OF THE DRAWINGS

The above and other features of the present invention will now be described in detail with reference to certain exemplary embodiments thereof, illustrated in the accompanying drawings which are given hereinbelow by way of illustration only, and thus are not limitative of the present invention, and wherein.

Figure 1:
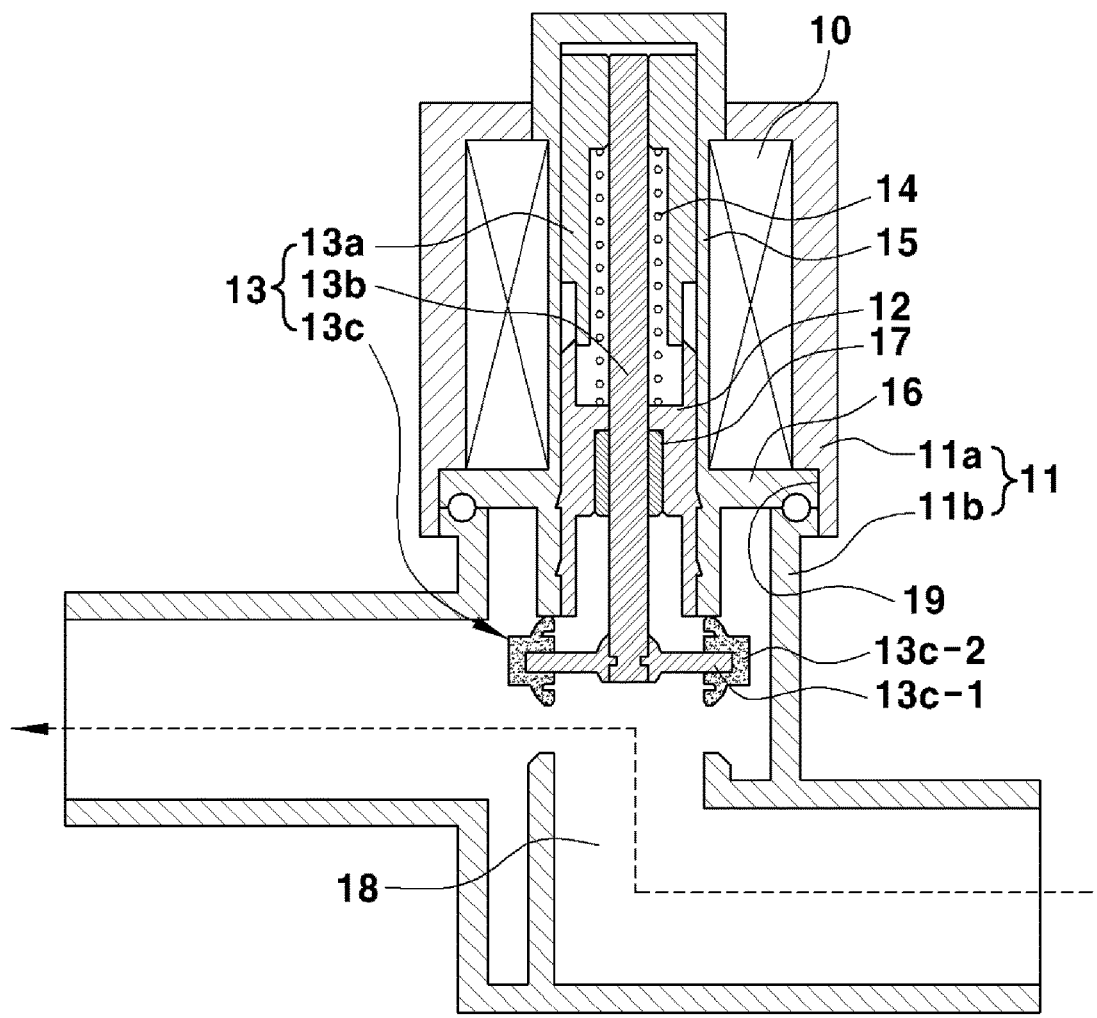
FIG. 1 is a cross-sectional view showing the opened state of a canister closed valve for an automotive fuel system according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described in detail with reference to the accompanying drawings.

Figure 2:
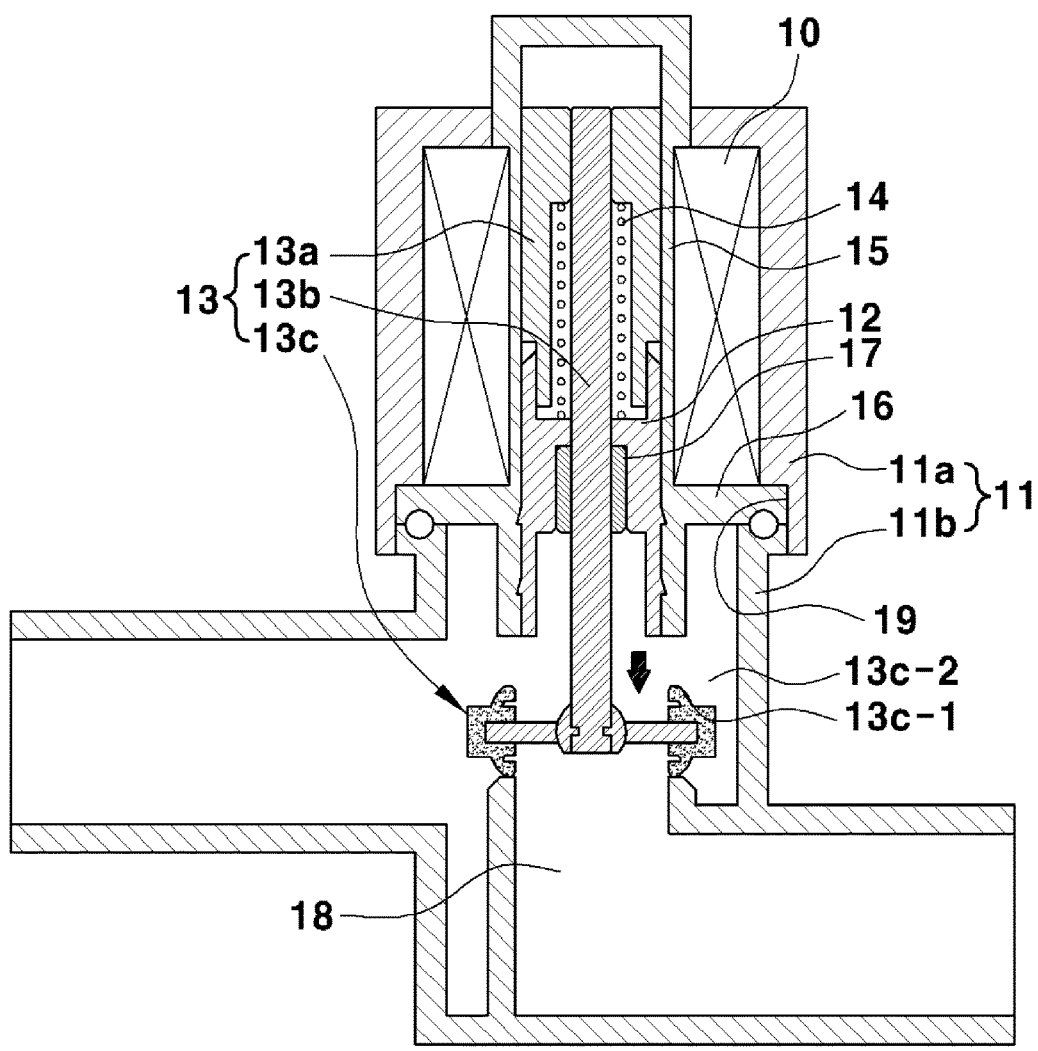
FIG. 2 is a cross-sectional view showing the closed state of a canister closed valve for an automotive fuel system according to the embodiment of the present invention.
Figure 3:
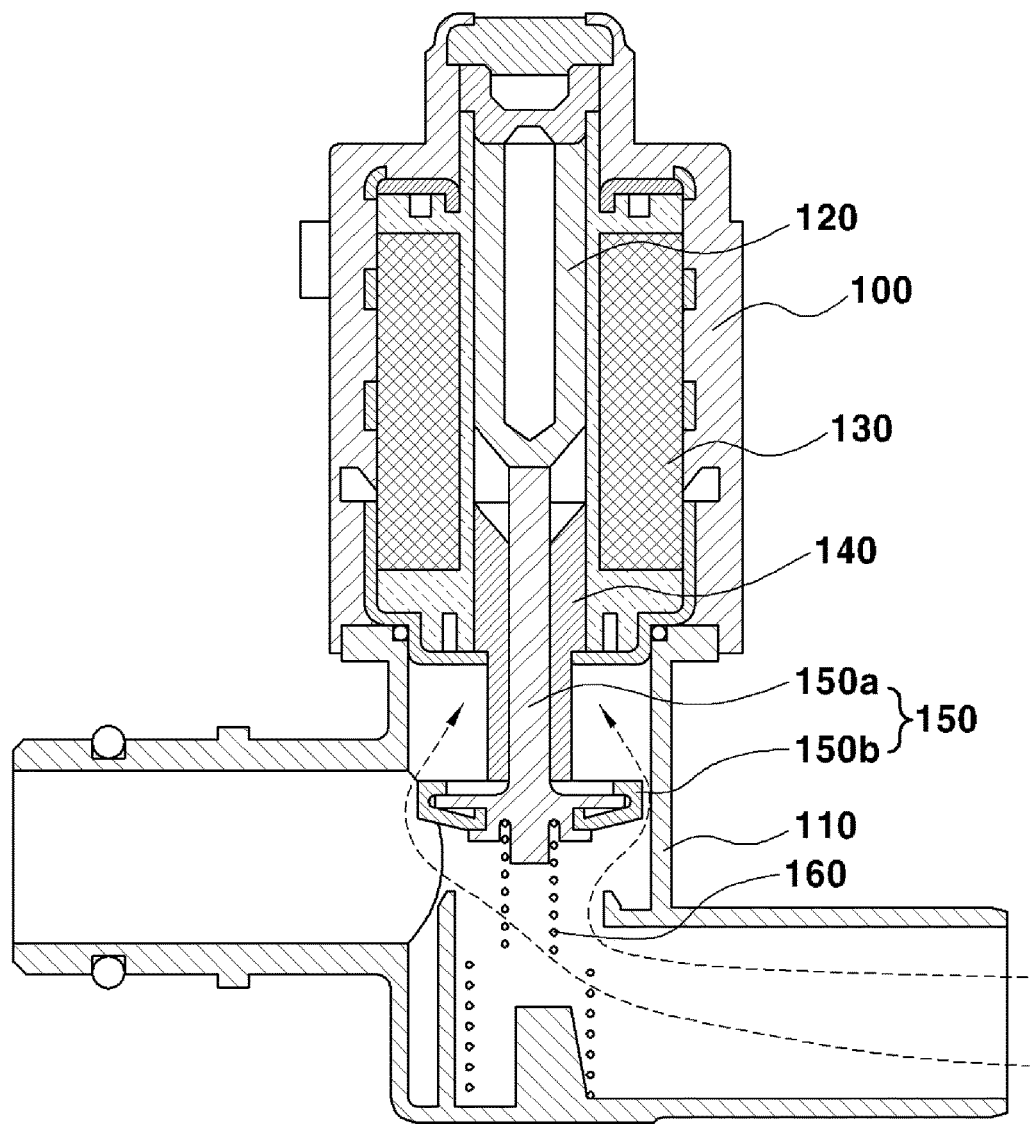
FIG. 3 (RELATED ART) is a cross-sectional view showing a conventional canister closed valve for an automotive fuel system.

FIGS. 1 and 2 are cross-sectional views respectively showing opened and closed states of a canister closed valve for an automotive fuel system according to an embodiment of the present invention.

As shown in FIGS. 1 and 2, the canister closed valve according to the present invention includes a valve body 11 serving to protect a coil assembly 10 and internal components.

The valve body 11 includes an upper body 11a, which is configured to have a cylindrical shape and to protect the coil assembly 10 and the internal components, and a lower body 11b defining therein a pipe channel 18 for allowing fluid flow between a canister and an air filter. The upper body 11a and the lower body 11b are vertically coupled to each other.

In an example, the upper body 11a has a recess 19, which is formed in the inner surface of the lower end thereof, and into which a flange portion of the lower body 11b is fitted together with a flange 16 of an inner housing 15, which will be described later.

Here, a sealing member such as an O-ring may be interposed between the flange portion of the lower body 11b and the flange 16 of the inner housing 15.

The upper body 11a, the lower body 11b and the flange 16 of the inner housing 15 may be coupled to one another through welding, bonding or the like. The upper body 11a may be molded through a mold injection process.

The canister closed valve includes the inner housing 15, which serves as means for accommodating magnetic circuit components, such as a plunger and rod assembly 13.

The inner housing 15 is configured to have a cylindrical shape having an open lower end, and is provided at the lower end thereof with the flange 16. Accordingly, the inner housing 15 may be installed in a manner that the flange 16 of the inner housing 15 is disposed between the upper body 11a and the lower body 11b of the valve body 11, which are coupled to each other.

Specifically, the inner housing 15 is vertically disposed in the upper body 11a so as to be concentric with the axis of the upper body 11a. In this state, the flange 16 of the lower end of the inner housing 15 comes into contact with the flange portion of the lower body 11b, and the flange 16 and the flange portion are coupled to each other by means of fastening members such as bolts.

The inner housing 15 may be made of a plastic material or the like.

When the plunger and rod assembly 13 is raised, the opening of the lower end of the inner housing 15 is closed by a sealing portion 13c, and accordingly the inner space of the inner housing 15 is isolated from atmospheric air. Consequently, magnetic circuit components, such as a core 12, the plunger and rod assembly 13, and the like, which are disposed in the inner housing 15, are not exposed to a corrosive environment.

The canister closed valve further includes a coil assembly as means for converting electric energy into magnetic energy.

The coil assembly 10, which is a cylindrical structure including a bobbin, a coil, an insulative tape and the like, serves to convert electric energy into magnetic energy.

Since the function of the coil assembly 10 is the same as that of conventional coil assemblies, detailed description thereof is omitted.

The coil assembly 10 is concentrically fitted in the closed space defined between the inner surface of the upper body 11a and the outer surface of the inner housing 15. Accordingly, the coil assembly 10 is isolated from the pipe channel 18 of the lower body 11b, which is exposed to atmospheric air, and is thus not exposed to a corrosive environment.

The canister closed valve further includes a core 12 as a magnetic circuit component, which is magnetized upon the application of power.

The core 12 is fixedly fitted into the lower end of the inner housing 15, and has a hole formed along the axis thereof, through which a rod portion 13b of the plunger and rod assembly 13 extends.

The core 12 is magnetized when the power is applied to the coil assembly 10. By the magnetic force generated at this time, a plunger portion 13a of the plunger and rod assembly 13, which is magnetized upon the application of power to the coil assembly 10, may be lowered.

For example, when the power is applied to the coil assembly 10, the plunger portion 13a, which is disposed at an upper position, and the core 12, which is disposed at a lower position, may be magnetized concurrently. Since the upper end of the plunger portion 13a and the lower end of the core 12 are respectively magnetized with an N polarity and an S polarity or an S polarity and an N polarity depending on the direction in which a coil is wound, attractive force is applied between the core 12 and the plunger portion 13a, and the entire plunger and rod assembly 13, including the plunger portion 13a, is thus drawn downward.

The hole of the core 12, through which the rod portion 13b extends, is provided therein with a tube-shaped guide 17. The guide 17 serves to guide the rod portion 13b, which is moved up and down.

The canister closed valve includes the plunger and rod assembly 13 as a means that moves up and down so as to selectively block the pipe channel or the inside of the inner housing 15.

The plunger and rod assembly 13, which serves to block the pipe channel or the inside of the inner housing 15 by the upward and downward movement of the plunger, includes the plunger portion 13a, which is magnetized and moved up and down upon the application of power, the sealing portion 13c serving to substantially block the pipe channel or the inside of the inner housing 15, and the rod portion 13b connecting the plunger portion 13a and the sealing portion 13c to each other.

Specifically, the upper end of the cylindrical plunger portion 13a is fitted on the upper end of the rod portion 13b so as to be parallel thereto, and the disc-shaped sealing portion 13c is fitted on the lower end of the rod portion 13b.

The rod portion 13b of the plunger and rod assembly 13 may be made of a plastic material or the like.

Since the plunger portion 13a of the plunger and rod assembly 13 is disposed at the upper end of the inner housing 15, that is, at a position spaced upward apart from the core 12 fitted into the lower end of the inner housing 15, the rod portion 13b extends downward through the core 12 from the upper end of the inner housing 15 such that the lower end of the rod portion 13b is disposed in the pipe channel 18 of the lower body 11b. The sealing portion 13c is coupled to the lower end 13b of the rod portion 13b, and is disposed in the pipe channel 18 of the lower body 11b.

The sealing portion 13c includes a disc-shaped seal body 13c-1 coupled to the rod portion 13b, and a seal rubber 13c-2, which is coupled to the outer edge of the seal body 13c-1 and is made of rubber or the like. The seal rubber 13c-2 serves to block the pipe channel 18 or the lower end of the inner housing 15.

The seal rubber 13c-2 of the sealing portion 13c is configured to be symmetrical with respect to a horizontal line. Accordingly, the seal rubber 13c-2 may block the pipe channel 18 using a lower elastic body thereof when the plunger and rod assembly 13 is lowered (valve actuation state), and may block the open lower end of the inner housing 15 using an upper elastic body thereof when the plunger and rod assembly 13 is raised (valve non-actuation state).

In order to sufficiently block the lower end of the inner housing 15, the outer diameter of the sealing portion 13c is preferably set to be equal to or larger than the diameter of the lower end of the inner housing 15.

The canister closed valve further includes a spring 14 as a means for returning the plunger and rod assembly 13 to open the pipe channel when the application of power is shut off.

The spring 14 is disposed between the inner housing 15 and the rod portion 13b such that the upper end thereof is supported by the upper surface of the plunger portion 13a and the lower end thereof is supported by the upper surface of the core 12.

The spring 14 is compressed when the plunger and rod assembly 13 is lowered. When the application of power is shut off, the spring 14 serves to raise the entire plunger and rod assembly 13 to the original position while expanding due to its own restoring force.

The operation of the canister closed valve, which is constructed as described above, will now be described.

FIG. 1 shows the canister closed valve, which is opened.

Specifically, when a vehicle runs normally, power is not applied to the coil assembly 10. At this time, the entire plunger and rod assembly 13 is disposed at the raised position by the restoring force of the spring 14.

At the same time, the sealing portion 13c of the plunger and rod assembly 13 blocks the lower end of the inner housing 15. Accordingly, the core 12, the plunger portion 13a and the like, which are the magnetic circuit components installed in the inner housing 15, are not exposed to a corrosive environment, thereby preventing corrosion of the magnetic circuit components.

In other words, it is possible to completely prevent calcium chloride power from infiltrating into the inner housing 15, and it is thus possible to protect the magnetic circuit components.

FIG. 2 shows the canister closed valve, which is closed.

Specifically, when an automotive fuel system is tested for leaks, the power is applied to the coil assembly 10. At this time, the plunger and rod assembly 13 is magnetized and lowered.

Accordingly, the sealing portion 13c of the plunger and rod assembly 13 blocks the pipe channel 18 of the lower body 11b. The leak test is carried out under the condition that the pipe channel 18 is blocked.

As is apparent from the above description, the present invention realizes a structure capable of bringing the sealing portion into contact with the inner housing using the restoring force of the spring so as to isolate the space, in which the magnetic components are accommodated from the air. Consequently, the magnetic circuit components are prevented from being exposed to the corrosive environment, thereby preventing corrosion of the components. Accordingly, by virtue of reduction of problems such as malfunctions, claims are reduced, and customer satisfaction is increased.

The invention has been described in detail with reference to a preferred embodiment thereof. However, it will be appreciated by those skilled in the art that changes may be made in the embodiment without departing from the principles and spirit of the invention, the scope of which is defined in the appended claims and their equivalents.

What is claimed is:

1. A canister closed valve for an automotive fuel system, comprising:
    a valve body for protecting a coil assembly;
    the coil assembly for converting electric energy into magnetic energy;
    a plunger and rod assembly, which includes a plunger portion, a rod portion and a sealing portion, and which is magnetized and is moved up and down so as to block a pipe channel when power is applied;
    a spring for restoring the plunger and rod assembly so as to open the pipe channel when the application of power is shut off; and
    an inner housing, which is disposed in the valve body, accommodates a core and the plunger and rod assembly, and includes an internal space isolated from atmospheric air by the sealing portion configured to block a lower end of the inner housing when the plunger and rod assembly is raised,
    wherein the inner housing includes a flange formed at the lower end thereof, and the flange is interposed between an upper body and a lower body of the valve body so as to couple the inner housing to the valve body.

2. The canister closed valve of claim 1, wherein the sealing portion of the plunger and rod assembly is configured to be symmetrical with respect to a horizontal line so as to perform a function of blocking the pipe channel and a function of blocking the internal space of the inner housing.

3. The canister closed valve of claim 1, wherein the inner housing is configured to have a cylindrical shape having an open lower end, and is vertically disposed in an upper body of the valve body in an axial direction.

4. The canister closed valve of claim 1, wherein the coil assembly is fitted into a closed space defined between an inner surface of an upper body of the valve body and an outer surface of the inner housing.

5. The canister closed valve of claim 1, wherein the core includes a guide, which is fitted into a hole in the core through which the rod portion extends so as to guide upward and downward movement of the rod portion.

6. The canister closed valve of claim 1, wherein the core is disposed in the inner housing and is magnetized when power is applied.

7. The canister closed valve of claim 6, wherein, when power is applied to the coil assembly, the core and the plunger portion are concurrently magnetized so as to apply attractive force therebetween, thereby lowering the entire plunger and rod assembly.

8. The canister closed valve of claim 1, wherein an upper end of the plunger portion is fitted on an upper end of the rod portion so as to be parallel thereto, and a disc-shaped sealing portion is fitted on a lower end of the rod portion.

9. The canister closed valve of claim 1, wherein the upper body has a recess, which is formed in an inner surface of the lower end thereof, and into which a flange portion of the lower body is fitted together with the flange of the inner housing.

10. The canister closed valve of claim 1, wherein an outer diameter of the sealing portion is equal to or larger than a diameter of the lower end of the inner housing.

11. The canister closed valve of claim 1, wherein the sealing portion includes a disc-shaped seal body coupled to the rod portion, and a seal rubber, which is coupled to the outer edge of the seal body and is made of rubber.

* * * * *